(12) United States Patent
Liu et al.

(10) Patent No.: US 7,911,382 B2
(45) Date of Patent: Mar. 22, 2011

(54) SYSTEM AND METHOD OF TRANSFERRING LOCATION ASSISTANCE INFORMATION BETWEEN ELECTRONIC DEVICES

(75) Inventors: Charles Liu, Chapel Hill, NC (US); L. Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 65 days.

(21) Appl. No.: 12/210,658

(22) Filed: Sep. 15, 2008

(65) Prior Publication Data

US 2010/0066599 A1    Mar. 18, 2010

(51) Int. Cl.
*G01S 19/25* (2010.01)
*G01S 19/06* (2010.01)

(52) U.S. Cl. ............... 342/357.64; 342/357.43

(58) Field of Classification Search ............ 342/357.01, 342/357.06, 357.09, 357.42, 357.43, 357.64, 342/357.71; 701/207, 213
See application file for complete search history.

(56) References Cited

U.S. PATENT DOCUMENTS

| 6,816,782 B1 | 11/2004 | Walters et al. | |
| 2005/0227709 A1* | 10/2005 | Chang et al. | 455/456.1 |
| 2007/0254676 A1 | 11/2007 | Pedigo et al. | |

FOREIGN PATENT DOCUMENTS

| WO | 98/48396 | 10/1998 |
| WO | 2005/032197 | 4/2005 |
| WO | 2006/117198 | 11/2006 |

OTHER PUBLICATIONS

"Near Field Communication White Paper", Mar. 2006, Internet Citation (Online) http://www.ecma-international.org/activities/Communications/2004tg19-001.pdf.
International Search Report and Written Opinion for International Application No. PCT/US2009/037052 dated Jul. 20, 2009.
International Preliminary Report on Patentability for International Application No. PCT/US09/37052 dated Sep. 2, 2010.

* cited by examiner

*Primary Examiner* — Dao L Phan
(74) *Attorney, Agent, or Firm* — Renner, Otto, Boisselle & Sklar, LLP (57) ABSTRACT

A system and method for exchanging location assistance information between electronic devices using a near field communication (NFC) interface. Positioning satellite signals are received from one or more position satellites. Location assistance information is generated based at least in part on the received positioning satellite signals and/or navigation information. The location assistance information is transferred through a near field communication interface from the first electronic device to another electronic device, wherein the location assistance information includes one or more contemporaneous positioning satellite signals received by the first electronic device.

18 Claims, 3 Drawing Sheets

SYSTEM AND METHOD OF TRANSFERRING LOCATION ASSISTANCE INFORMATION BETWEEN ELECTRONIC DEVICES

TECHNICAL FIELD OF THE INVENTION

The technology of the present disclosure relates generally to electronic devices and, more particularly, to a system and method for transferring location assistance information between electronic devices.

BACKGROUND

Mobile wireless electronic devices are becoming increasingly popular. For example, mobile telephones, global positioning systems, portable media players and portable gaming devices are now in wide-spread use. In addition, the features associated with certain types of electronic devices have become increasingly diverse. To name a few examples, many electronic devices have communication capability, navigation capability, imaging capability, text messaging capability, Internet browsing capability, electronic mail capability, video playback capability, audio playback capability, image display capability and handsfree capability, etc.

While mobile electronic devices may provide the user with the ability to use a number of features, current electronic devices do not provide a convenient way of transferring location assistance information with other electronic devices. For instance, a user is generally not able to transfer location assistance information from a first electronic device to a second electronic device. Instead, the user is generally required to perform a "cold" start of the navigation system associated with the second electronic device. A "cold" start in the context of the present disclosure generally requires an electronic device to acquire satellite information or other navigation information independent of information that is available from other devices located within communication range of the electronic device. A "cold" start generally requires a substantial amount of time to perform and may disrupt or otherwise delay a user desiring to switch from the navigation system associated with one electronic device to the navigation system associated with another electronic device.

SUMMARY

To improve a user's ability to transfer location assistance information from one electronic device to another electronic device, the present disclosure describes a system and method that utilizes near field communication (NFC) for transferring location assistance information between two electronic devices. The location assistance information transferred includes one or more contemporaneous positioning satellite signal conditions associated with the present location of the electronic devices.

In one embodiment, when a user desires to transfer location assistance information from one electronic device to another, the user places the electronic device in close proximity to the other electronic device to establish a NFC communication link. Location assistance information is then transferred directly from one electronic device to the other electronic device through a NFC link. The location assistance information transferred includes contemporaneous time information and positioning satellite signal conditions based on the present location of at least one of the electronic devices.

One aspect of the invention relates to a method for exchanging location assistance information between electronic devices, the method including: transferring location assistance information from a first electronic device to a second electronic device through a near field communication interface, wherein the location assistance information is derived from one or more contemporaneous positioning satellite signals received by the first electronic device.

Another aspect of the invention relates to the first electronic device generating location assistance information based on one or more of the received positioning satellite signals.

Another aspect of the invention relates to the location assistance information further including at least one of signal strength or multipath characteristics of the positioning satellite signals received by the first electronic device.

Another aspect of the invention relates to the location assistance information further including at least one of ephemeris or almanac information associated with the received positioning satellite signals.

Another aspect of the invention relates to the location assistance information exchanged between the first electronic device and the second electronic device being used by the second electronic device to shorten a time-to-first-fix with one or more positioning satellites.

Another aspect of the invention relates to searching for available positioning satellites by the second electronic device based on the received location assistance information from the first electronic device.

Another aspect of the invention relates to determining the position of the second electronic device based on the received location assistance information from the first electronic device.

Another aspect of the invention relates to the received location assistance information including navigation information.

Another aspect of the invention relates to updating the location assistance information received by the second electronic device by the second electronic device receiving one or more positioning satellite signals directly from one or more positioning satellites.

Another aspect of the invention relates to at least one of the first electronic device or the second electronic device being a mobile terminal.

Another aspect of the invention relates to the first electronic device and the second electronic device being mobile terminals.

One aspect of the invention relates to a mobile terminal, including: a satellite receiver for receiving positioning satellite signals from one or more positioning satellites; a control circuit for processing the received positioning satellite signals and generating location assistance information based on the received positioning satellite signals, wherein the location assistance information includes one or more contemporaneous positioning satellite signals received by the satellite receiver; and a near field communication adapter configured to transfer the location assistance information to a another electronic device through a near field communication protocol.

Another aspect of the invention relates to the satellite receiver being a global positioning receiver.

Another aspect of the invention relates to the location assistance information includes at least one of signal strength or multipath characteristics of the positioning satellite signals received by the mobile terminal.

Another aspect of the invention relates to the location assistance information including at least one of ephemeris or almanac information.

Another aspect of the invention relates to a user interface for manually initiating the transfer of location assistance information to the electronic device.

Another aspect of the invention relates to the near field communication adapter detecting when the remote mobile terminal is within an operable range of the mobile terminal and automatically initiates transfer of the location assistance information to the remote mobile terminal.

Another aspect of the invention relates to the mobile terminal being configured to transmit the location assistance information in response to a request received from the electronic device.

One aspect of the invention relates to a method for exchanging location assistance information between a mobile terminal and an electronic device, the method including: receiving one or more positioning satellite signals at a mobile terminal; generating location assistance information based at least in part on the received positioning satellite signals; and transferring the location assistance information through a near field communication interface from the mobile terminal to the electronic device, wherein the location assistance information includes one or more contemporaneous positioning satellite signals received by the mobile terminal.

Another aspect of the invention relates to the location assistance information being used by the electronic device to shorten a time-to-first-fix with the one or more positioning satellites and/or improve accuracy of a computed location associated with the electronic device.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Embodiments will now be described with reference to the drawings, wherein like reference numerals are used to refer to like elements throughout. It will be understood that the figures are not necessarily to scale.

In the present document, embodiments are described primarily in the context of a mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a portable global positioning system, a global positioning system built-in a vehicle (e.g., an automobile, truck, airplane, boat, etc.), a navigation receiver, a positioning receiver or any electronic device incorporating a global positioning system, a navigation receiver and/or a positioning receiver. Such devices will be collectively referred to herein as a "mobile terminal".

Figure 1:
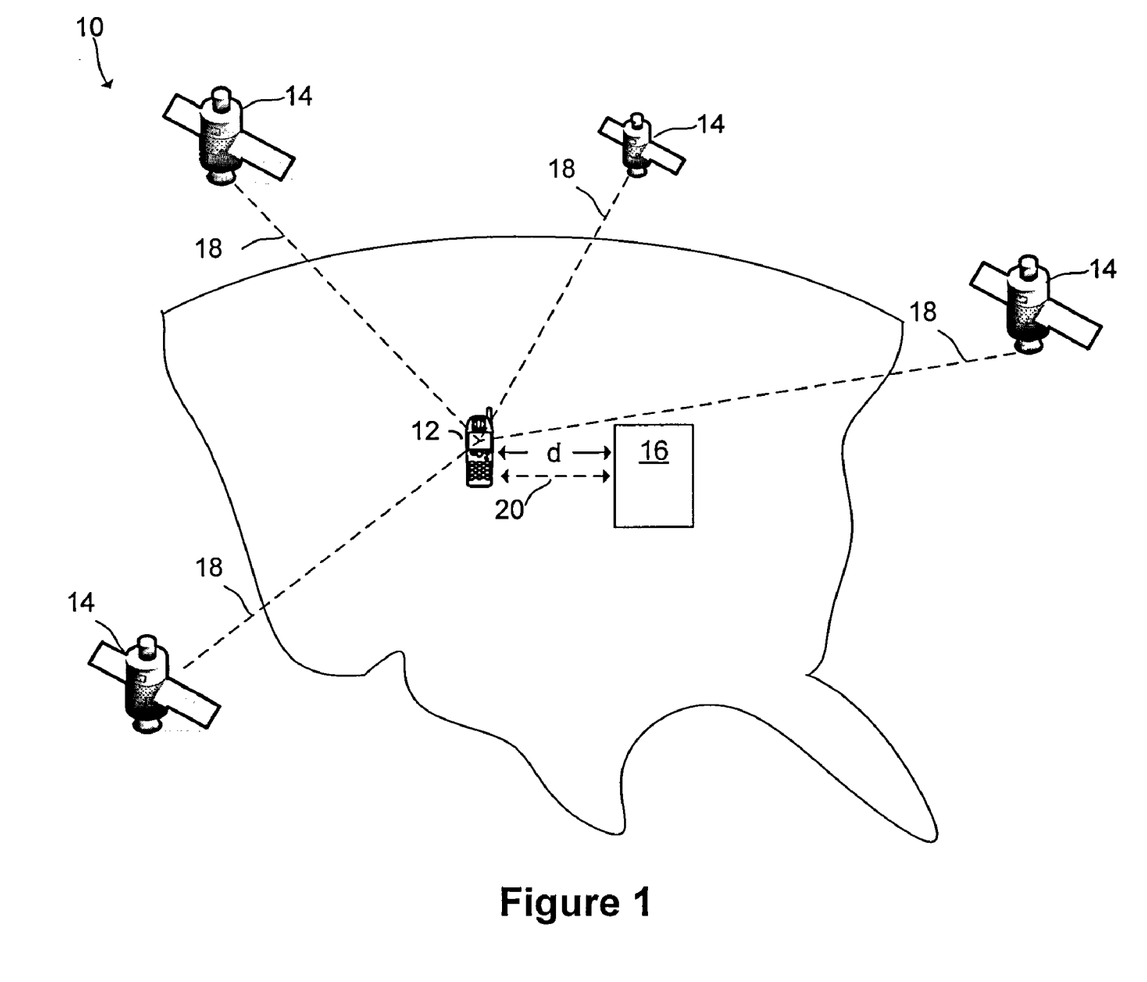
FIG. 1 is a schematic diagram of a communications system in which an exemplary electronic device may communicate with a remote electronic device.

Referring initially to FIG. 1, an exemplary system 10 in accordance with aspects of the present invention is illustrated. The system 10 includes a mobile terminal 12, a plurality of positioning satellites 14 and a second mobile terminal 16. The mobile terminals 12, 16 may be any type of electronic device that is capable of receiving satellite positioning signals 18 from one or more of the plurality of positioning satellites 14 and communicate with other mobile terminals through a near field communication (NFC) link. For example, mobile terminals 12, 16 may be in the form of a mobile telephone that has built-in positioning capabilities. Mobile terminals 12, 16 may also be built-in to a vehicle (e.g., an automobile, truck, airplane, boat, etc.).

Electronic device 12 may receive satellite positioning signals 18 from one or more of the positioning satellites and transfer location assistance information from the electronic device 12 to the mobile terminal 16 through a NFC link 20, when the devices are within an operable communication distance "d". Electronic device 12 may also receive location assistance information from the mobile terminal 16 through the NFC link 20. The location assistance information is provided from one mobile terminal to another in order for the receiving electronic device to tailor its positioning satellite search, which results in improved sensitivity and time-to-first-fix, for example.

As used herein "time-to-first-fix" means the amount of time it will take a positioning receiver to determine its first geographical position after it has been turned off for an extended period of time.

The following description of the invention uses GPS as an example of an applicable positioning/navigation technology. However, this description is not intended to limit the invention to GPS receivers. Other positioning technologies such as Russian GLONASS, China COMPASS, Europe Galileo, and India IRNSS are also deemed to be within the scope of the present invention.

GPS is a space-based triangulation system that uses positioning satellites 14 and GPS control computers (not shown) to measure positions anywhere on the earth. GPS was first developed by the United States Department of Defense as a navigational system. The advantages of this navigational system over land-based systems are that it is not limited in its coverage and it provides continuous 24-hour coverage, which may be highly accurate regardless of weather conditions. In operation, a constellation of 24 positioning satellites 14 orbiting the earth continually emit a GPS radio signal (also referred herein as "positioning satellite signals") 18. A positioning receiver 22 (FIG. 3) in the electronic device 12 receives the positioning satellite signals 18 from the visible positioning satellites and measures the time that the positioning satellite signals 18 takes to travel from the positioning satellites 14 to an antenna associated with the positioning receiver 22. By multiplying the travel time by the speed of light, the positioning receiver 22 can calculate a range for each positioning satellite 14 in view. Ephemeris information provided in the positioning radio signal typically describes the satellite's orbit and velocity, thereby enabling the mobile terminal to calculate its geographical position through a process of triangulation.

Figure 3:
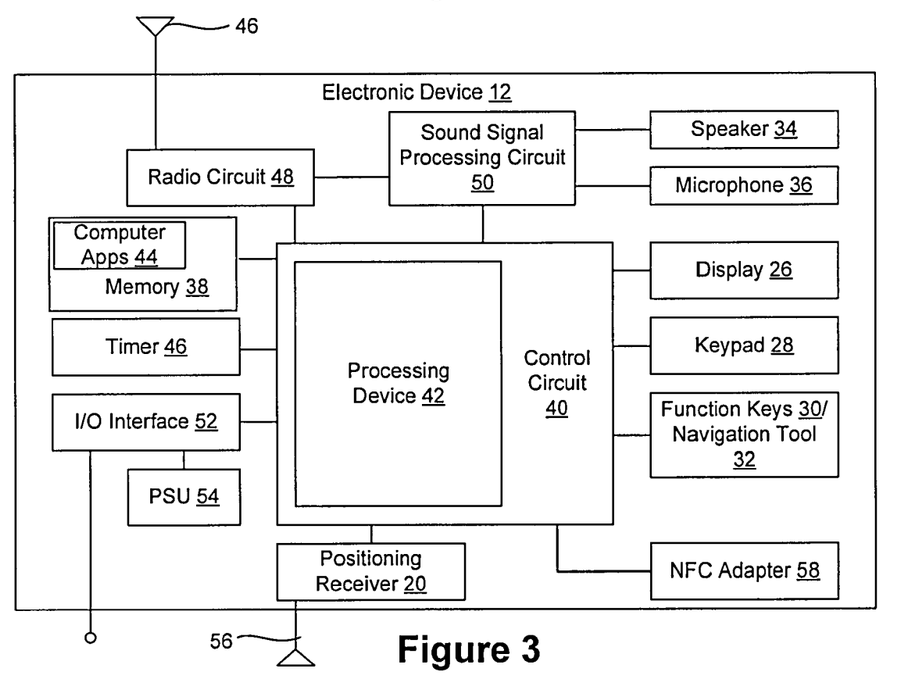
FIG. 3 is a schematic block diagram of the mobile telephone in accordance with aspects of the present invention.

The startup of a GPS receiver typically requires the acquisition of a set of navigational parameters from the navigational data signals of four or more positioning satellites 14. This process of initializing a positioning receiver 22 may often take several minutes. The duration of the GPS initialization process is directly dependent upon how much information a positioning receiver 22 has initially. Some positioning receivers 22 are programmed with almanac data, which coarsely describes the expected satellite positions for up to one year ahead. However, if the positioning receiver 22 does not have some knowledge of its own approximate location, then the positioning receiver 22 may not be able to find or acquire signals from the visible satellites quickly enough, and, therefore, cannot calculate its position quickly. Furthermore, it should be noted that higher signal strength is typically needed for capturing the navigation data at start-up than is needed for continued monitoring of an already-acquired signal. It should also be noted that the process of monitoring the positioning satellite signals may be significantly affected by environmental factors. Thus, positioning satellite signals that may be easily acquired in the open (e.g., unobstructed view between mobile terminal and the one or more positioning satellites) typically becomes harder to acquire when a positioning receiver is under foliage, in a vehicle or in a building, for example.

Aspects of the present invention provide the positioning receiver with location assistance information, which may include relative or absolute signal strengths of the positioning satellites at the present time and location to reduce the start-up time required by directing the satellite search process to begin with the satellites(s) with the highest signal strength, for example.

Figure 2:
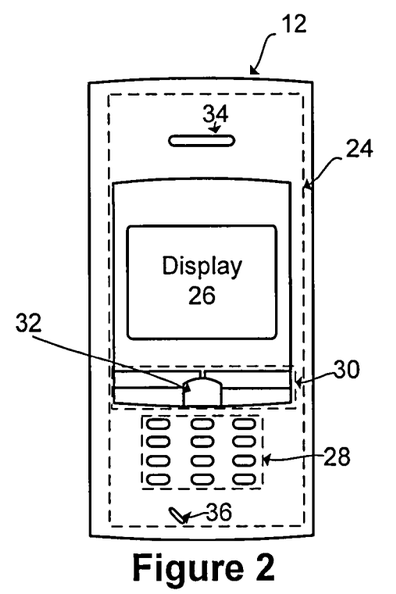
FIG. 2 is a schematic view of a mobile telephone as an exemplary mobile terminal in accordance with aspects of the present invention.

Referring to FIG. 2, an exemplary electronic device 12 (also referred to herein as a terminal or mobile terminal) is illustrated. As stated above, the electronic device 12 may be any type of electronic device that is capable of receiving satellite positioning signals 18 from one or more of the plurality of positioning satellites 14 and exchange information with one or more other terminals (e.g., mobile terminal 16, stationary terminals, etc.) through a NFC link.

As illustrated in FIG. 2, the electronic device 12 may include a user interface 24 (identified by dotted lines) that enables the user easily and efficiently to perform one or more communication tasks (e.g., identify a contact, select a contact, make a telephone call, receive a telephone call, establish and manage local wireless and/or wired exchanges of information with a remote mobile terminal, enter position information, enter navigation information, etc.). The user interface 24 of the electronic device 12 may include one or more of the following components: a display 26, an alphanumeric keypad 28, function keys 30, a navigation tool 32, a speaker 34, and/or a microphone 36.

The display 26 may present information in a viewable format to a user of the electronic device 12. Such information may include operating state, time, telephone numbers, contact information, unique identifiers, various navigational menus, status of one or more functions, photographs, multimedia, position information, navigation information, etc., which may enable the user to utilize the various features of the electronic device 12. The display 26 may also be used to visually present content accessible by the electronic device 12. The displayed content may include position information and/or navigation information in the form of maps, routes, etc. Other such information may include E-mail messages, audio and/or video presentations stored locally in memory 38 (FIG. 3) of the electronic device 12 and/or stored remotely and downloaded to the electronic device 12 (e.g., from a remote storage device, a mail server, remote personal computer, etc.).

The alphanumeric keypad 28 provides for a variety of user input operations. For example, the keypad 28 may include alphanumeric keys for allowing entry of alphanumeric information such as user-friendly identification of contacts, street addresses, E-mail addresses, distribution lists, telephone numbers, phone lists, contact information, notes, etc. The electronic device 12 may also include function keys 30 such as a "call send" key for transmitting an E-mail, initiating or answering a call, initiating the transfer of location assistance information between the mobile terminal and a remote mobile terminal (e.g., mobile terminal 16), and a "call end" key for ending, or "hanging up" a call. The navigation tool 32 may include menu navigation keys, for example, for navigating through a menu displayed on the display 26 to select different telephone functions, profiles, settings, etc., as is conventional. Other keys associated with the electronic device 12 may include a volume key, audio mute key, an on/off power key, a web browser launch key, a local adapter association key (e.g., for wired and/or wireless communications), an E-mail application launch key, a camera key, etc. Keys or key-like functionality may also be embodied as a touch screen associated with the display 26.

The electronic device 12 may also include conventional call circuitry that enables the mobile terminal to establish a call, transmit and/or receive E-mail messages, and/or exchange signals with a called/calling device, typically another mobile telephone or landline telephone. However, the called/calling device need not be another telephone, but may be some other electronic device such as an electronic device compliant with one or more communication protocols, Internet web server, E-mail server, content providing server, etc.

Referring to FIG. 3, a functional block diagram of the exemplary electronic device 12 is illustrated. The electronic device 12 includes a control circuit 40 that is configured to carry out overall control of the functions and operations of the mobile terminal 12. The control circuit 40 may include a processing device 42, such as a CPU, microcontroller or microprocessor. The processing device 42 executes code stored in a memory (not shown) within the control circuit 40 and/or in a separate memory, such as memory 38, in order to carry out operation of the electronic device 12 and perform all of the functionality disclosed herein.

The memory 38 may be any suitable memory device for storing information. For example, the memory 38 may be, for example, random access memory, read only memory, a buffer, a flash memory, a hard drive, a removable media, a volatile memory and/or a non-volatile memory. In order to carry out the various functions described herein, the memory 38 may include one or more computer applications 44 (or sub-applications), including one or more computer applications to interpret and/or otherwise process position signals received from one or more position satellites. The one or more computer applications 44 further may include an application to establish a NFC link 20 with one or more electronic devices (e.g., remote mobile terminal 16 (shown in FIG. 1)) located within an operable distance "d" from the electronic device 12 to facilitate exchanging information with the one or more remote mobile terminals through the NFC communication link 20.

Continuing to refer to FIGS. 2 and 3, the electronic device 12 may include an antenna 46 coupled to a radio circuit 48. The radio circuit 48 may include a radio frequency transmitter and receiver for transmitting and receiving signals via the antenna 46, as is conventional. The electronic device 12 may utilize the radio circuit 48 and antenna 46 for voice, Internet and/or E-mail communications over a cellular telephone network. The electronic device 12 may further include a sound signal processing circuit 50 for processing the audio signal transmitted by/received from the radio circuit 46. Coupled to the sound processing circuit 50 are the speaker 34 and the microphone 36, which enable a user to listen and speak through the electronic device 12, as is conventional. The radio circuit 48 and sound processing circuit 50 are each coupled to the control circuit 40 so as to carry out overall operation of the mobile terminal 12.

The electronic device 12 also includes the aforementioned display 26 and keypad 28 coupled to the control circuit 40. The electronic device 12 may further include an I/O interface 52. The I/O interface 52 may be in the form of typical mobile telephone I/O interface, such as a multi-element connector at the base of the electronic device 12 or other suitable I/O interface. As is typical, the I/O interface 52 may be used to couple the electronic device 12 to a battery charger to charge a power supply unit (PSU) 54 within the mobile terminal 12.

As stated above, the electronic device 12 also includes a positioning receiver 20 for receiving positioning signals from one or more positioning satellites 14. The positioning receiver 20 receives signals from one or more positioning satellites 14 through antenna 56. As used herein the phrase "received positioning satellite signals" means one or more signals received directly from one or more positioning satellites 14.

Positioning satellites 14 continuously broadcast a navigation message at 50 bit/s. The navigation message includes both data unique to the transmitting satellite and data common to all satellites. The navigation message contains time information, satellite clock correction data, ephemeris (precise orbital parameters), almanac (coarse orbital parameters), health data for all satellites, coefficients for the ionospheric delay model and coefficients to calculate the Universal Coordinated Time (UTC) from the positioning system time. The navigation message consists of 25 frames, and the frames are organized in such a way that a positioning receiver is able to obtain satellite-specific data (ephemeris) for exact position calculation within 30 seconds. This 30 second time period is the minimum time-to-first-fix of the positioning system in the general case. It takes 12.5 minutes to receive all the 25 frames completely.

The received positioning signals may be processed by the control circuit 40 along with one or more computer applications 44 to generate location assistance information based on the received positioning satellite signals. The location assistance information is provided from one electronic device to another electronic device to improve certain characteristics of GPS receiver performance, such as time-to-first-fix and sensitivity. Location assistance information may include, for example, positioning satellite ephemeris, almanac, reference time, reference location and ionospheric corrections, relative or absolute signal strengths of the positioning satellites at the present time and location, navigation information, waypoints, destinations, route information, etc. The reference location is derived from positioning satellite signals that correspond to the mobile terminals current geographical position, which, when used with other information, allows the receiver to determine which navigation satellites 14 are visible and to estimate the signal transit times from the each satellite. Generally, without this aiding information, acquiring the satellite signals and computing the receiver's exact location could take much longer. This delay could have serious impacts on the performance of mobile location-based services, which tend to be time-sensitive.

The location assistance data is generated based on positioning satellite signals obtained directly from one or more of the positioning satellites substantially contemporaneously with transferring the location assistance information from one mobile terminal to another mobile terminal. As used herein, the terms "contemporaneously" or "substantially contemporaneously" means close enough in time that data from the positioning satellites is currently useful (e.g., in time and/or geographical location) for determine the position of the device and/or to obtaining positioning satellite signals.

One advantage with transferring location assistance information that has been derived from data received directly from one or more of the positioning satellites substantially contemporaneously with transferring the information is that the location assistance information provided is highly tailored to the current local environment that the source mobile terminal has in common with the receiving mobile terminal. For example, the source electronic equipment 12 (e.g., a mobile terminal) may provide information about the relative signal strengths of the positioning satellites observed at the current location. This information allows the receiving electronic device 16 (e.g., a mobile terminal, a portable electronic device, a device incorporate into a vehicle, etc.) to tailor the search for positioning satellites 14, which results in improved sensitivity and/or time-to-first-fix of the receiving electronic device. For instance, the receiving electronic device may direct the search to begin with the satellite having the highest signal strength at the current time and location. In addition, the source electronic device may provide the receiving electronic device with information about any multipath conditions observed at the current location, which the recipient may use to improve accuracy of any location computed using the received location assistance information.

The electronic device 12 includes a near field communication (NFC) adapter 58 to establish near field communications with other locally positioned electronic devices, such as a NFC-enabled and/or NFC-compliant electronic devices and the like (e.g., electronic device 16). As used herein, the phrases "NFC", "NFC-enabled" and "NFC-compliant" may be used interchangeably and refer to devices that are capable of communicating with other devices using one or more near field communication protocols. The NFC adapter 58 may be compatible with one or more NFC related protocols and allows the electronic device 12 to communicate other NFC-enabled and/or compliant devices. As used herein, the phrase "near field communication" and its acronym "NFC" fully comprises all of the communication features and functions associated with radio frequency identification (RFID) and any other near field communication protocols.

As one of ordinary skill in the art will appreciate, near field communication means establishing a communication link between two or more electronic devices (e.g., mobile terminals 12, 16) when the devices are within an operable range (shown in FIG. 1 as distance "d"). The operable range between devices for NFC is several tens of centimeters or less.

The electronic devices 12, 16 generally support an active communication mode. In the active communication mode, the mobile terminals 12, 16 modulate carrier waves corresponding to the electromagnetic waves generated by themselves so as to send information (e.g., request for location assistance information, location assistance information, etc.) at the proper time (e.g., when requested, when within the devices are within an operable range, etc.). When the NFC based on electromagnetic induction is performed, the mobile terminal that outputs the electromagnetic waves first to initiate the communication may be said to take the initiative and may be called the initiating mobile terminal. The initiating mobile terminal transmits information and/or a command to the target mobile terminal. The target mobile terminal may transmit a response associated with the command so as to establish the near field communication. The response may include information (e.g., location assistance information, profile information, acknowledgements, etc.). For example, if electronic device 12 begins outputting electromagnetic waves to start communication with the electronic device 16, then the electronic device 12 will be the initiator and electronic device 16 will be the target.

In the active mode, when the electronic device 12, which may the initiator, transmits information, the electronic device 12 generally first starts outputting electromagnetic waves by itself, and modulates the generated electromagnetic waves so as to send information to the electronic device 16. The electronic device 12 may stop outputting electromagnetic waves after the completion of the transmission of the information. When the electronic device 16, which may be the target, transmits information to the electronic device 12, the electronic device 16 generally begins outputting electromagnetic waves by itself, and modulates the electromagnetic waves so as to send data to the electronic device 12, which is the initiator. The electronic device 16 may terminate the transmission of the electromagnetic waves after the transmission of data is finished.

One of ordinary skill in the art will readily appreciate that the above discussion is exemplary in nature and in no way is intended to limit the scope of the present invention. For example, although the above description discusses electronic device 12 being the initiator and electronic device 16 being the target, electronic device 12 may also be the target and mobile terminal 16 may also be the initiator. As another alternative, a peer-to-peer mode of operation may exist to transfer location assistance information between the electronic devices 12, 16. In addition, a NFC-tag reading mode may also be utilized, for example, when one of the electronic devices is acquiring location assistance information or GPS information from a reference point with a fixed GPS location.

The exchange of location assistance information between electronic devices 12 and 14 may occur automatically when the devices are within the operable range "d" of the NFC communications. Alternatively or in addition, a user of one of the electronic devices 12, 16 may request transmission of the location assistance information from one device to the other, for example by using a user interface associated with one of the devices.

One benefit of utilizing NFC to transfer location assistance information from one electronic device to another is that due to the proximity necessitated by NFC, the location assistance information transferred from one electronic device to the other is likely to be closely geographically related, since the devices are required to be in close proximity to each other. This assumes that the electronic device that is transferring the location assistance information is recent in time and/or location, in which case the signal strength or other channel conditions related to the positioning satellites are identical or substantially identical for both devices.

Figure 4:
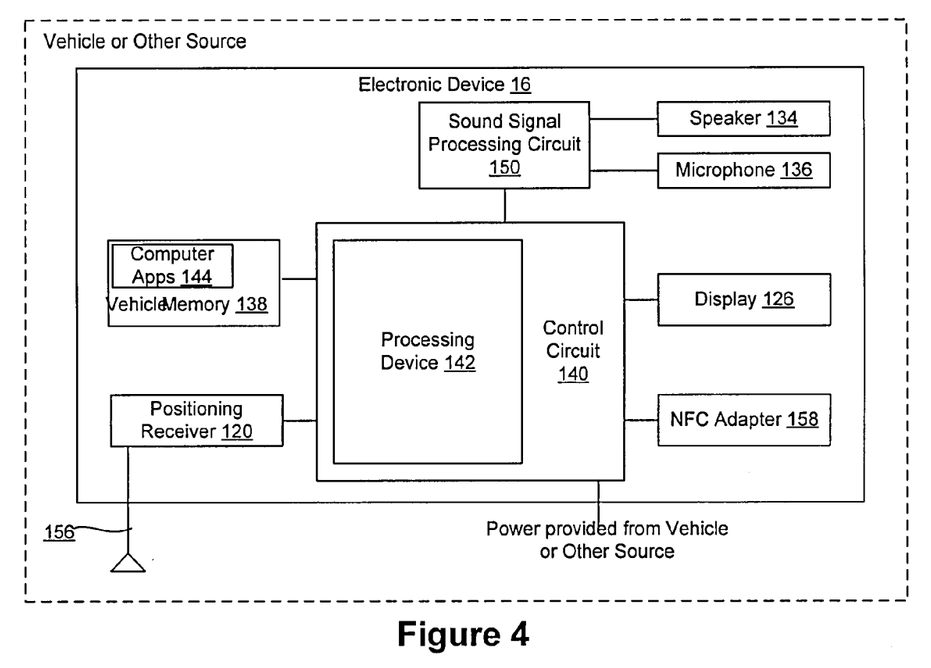
FIG. 4 is a schematic block diagram of an exemplary remote electronic device in accordance with aspects of the present invention.

Referring to FIG. 4, an exemplary schematic diagram is illustrated for electronic device 16. The mobile terminal 16 may be identical to mobile terminal 12, discussed above. In one embodiment, the mobile terminal 16 may be built-in to a vehicle (e.g., an automobile, truck, airplane, boat, etc.) or other source.

As such electronic device 16 may include many of the same components discussed above with respect to electronic device 12. For simplicity, like components related to electronic 16 and the electronic device 12 have been given the same reference numeral used to describe components related to electronic device 12 plus 100. For example, the electronic device 16 may include the following components: positioning receiver 120 (corresponds to position receiver 20 of electronic device 12), display 126, speaker 134, microphone 136, memory 138, control circuit 140, processing device 142, computer applications 144, antenna 156. The description and functionality for each of the components associated with the electronic device 16 are identical to those like components described above with reference to electronic device 12 and will not be repeated for the sake of brevity. Since electronic device 16 is built-in to the vehicle, the electronic device may utilize a power source of the vehicle (or other source) to provide power to the electronic device, as illustrated in FIG. 4. One of ordinary skill in the art will readily appreciate that the electronic device 16 may include additional components and/or omit components illustrated in FIG. 4.

Figure 5:
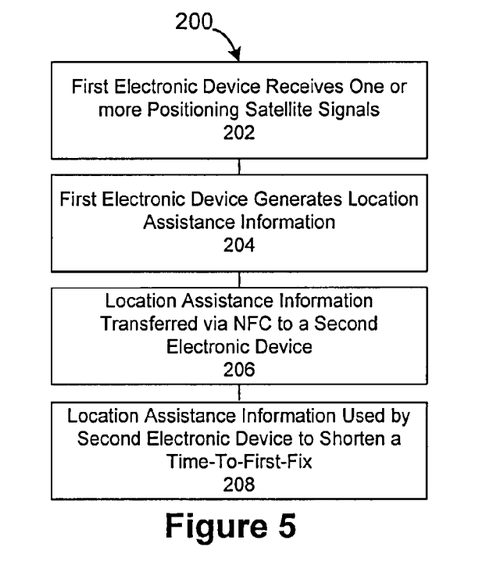
FIG. 5 is a flow chart representing an exemplary method of transferring location assistance information between mobile terminals in accordance with aspects of the present invention.

FIG. 5 is an exemplary method 200 for providing location assistance information to an electronic device is illustrated. At block 202, a first electronic device receives one or more positioning satellite signals. The positioning satellite signals may be obtained directly from one or more positioning satellites.

At block 204, the first electronic device generates location assistance information based at least in part on the received positioning satellite signals.

At block 206, the location assistance information is transferred through a near field communication interface from the first electronic device to another electronic device. The NFC interface (e.g., NFC link 20) is established between NFC adapters 58 and 158. The NFC adapters 58, 158 utilize magnetic field induction to exchange the location assistance information between the first electronic device and the second electronic device.

The location assistance information is derived from one or more contemporaneous positioning satellite signals received by the first mobile terminal. As set forth above, "contemporaneous" means that the signals are received close enough in time that data from the positioning satellites or observed characteristics of the positioning satellite signals is currently useful (e.g., in time and/or geographical location) to determine the position of the device and/or to obtain positioning satellite signals. The location assistance information may include ephemeris and almanac information and/or information about signal strength or other propagation characteristics of the received positioning satellite signals.

At step 208, the location assistance information may be used by the remote electronic device for any desired purpose. For example, the location assistance information may be used by the electronic device to shorten a time-to-first-fix with the one or more positioning satellites and/or improve accuracy of a computed location associated with the electronic device. The remote electronic device may also search for available positioning satellites based on the received location assistance information from the first electronic device. Additionally, the remote electronic device may determine its geographical position based on the received location assistance information from the first electronic device and update the received location assistance information by receiving one or more positioning satellite signals directly from one more positioning satellites.

The following are exemplary use cases that utilize one or more aspects of the present invention. A user, using an electronic device 12 (e.g., a mobile terminal) having a positioning receiver 20 integrated in the device, may be tracking his or her position and moving direction, as he or she walks and/or bicycling. The user arrives at his or her automobile and because the built-in navigation system in the user's car is more sophisticated (e.g., has a better antenna, larger screen, more navigation capabilities, etc.), the user would like to use the automobile navigation system, to navigate the user to the next destination. The automobile may have been parked in its current location for days or even weeks now during which the automobile's navigation system remained unused. In order to have the navigation system in the automobile obtain a position fix quicker than a conventional "cold" start (discussed above), and since the user already has location assistance information available on his electronic device used for hiking and/or bicycling, the user may utilize the NFC technology built-in both the user's electronic device and built-in automobile navigation system to transfer the location assistance information. The location assistance information, which was derived from one or more contemporaneous positioning satellite signals received by his mobile terminal, is then transferred from the user's mobile terminal to the automobile's navigation system.

Once the positioning receiver of the automobile navigation system receives the location assistance information, it may search for available positioning satellites based on the received location assistance information from the first electronic device to shorten a time-to-first-fix with one more positioning satellites. In addition, the position of the automobile navigation system may be determined using the received location assistance information from the mobile terminal.

Once the automobile navigation system acquires sufficient satellite positioning signals directly from the positioning satellites, the automobile navigation system may receive one or more positioning satellite signals directly from one or more positioning satellites to update the location assistance information received by the second mobile terminal by the second mobile terminal.

In another use case, a hiker or biker may drive to a trail for hiking and/or biking using the user's automobile. The user utilizes the automobile navigation system in order to get to the parking area at the start point of the trail. The user would like to continue to track his or her position using the positioning receiver 20 enabled on his mobile terminal 12 (e.g., a mobile telephone) for use on the trail. Due to the weak signal reception from positioning satellite signals and to conserve power for the mobile terminal, the user did not have his positioning receiver (e.g., positioning receiver 20) active while was driving.

At the parking lot, the user now activates positioning receiver of mobile terminal and initiates the transfer of the location assistance information from the automobile navigation system to the mobile terminal. The transfer may be initiated in any desired manner. For example, the transfer may be initiated by the user depressing a button on the automobile navigation system and/or the mobile terminal. In another embodiment, once the mobile terminal is placed within an operable communication distance "d" to the automobile navigation system, the location assistance information may automatically be transferred without any further user interaction.

The location assistance information transferred was derived from one or more contemporaneous positioning satellite signals received by automobile navigation system and then transferred from the automobile navigation system to the navigation system of the mobile terminal. Upon transfer of the location assistance information, positioning receiver 20 receives a "hot" start and is able to obtain a quick location fix so that the user may keep tracking himself or herself on the trail using the mobile terminal without waiting.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A method for providing location assistance information to a mobile terminal, the method comprising:
    transferring location assistance information from a first mobile terminal to a second mobile terminal through a near field communication interface, wherein the location assistance information is derived from one or more contemporaneous positioning satellite signals received by the first mobile terminal and the location assistance information exchanged between the first mobile terminal and the second mobile terminal are used by the second mobile terminal to shorten a time-to-first-fix with one or more positioning satellites.

2. The method of claim 1, wherein the one or more contemporaneous positioning satellite signals are received directly from one or more positioning satellites.

3. The method of claim 1, wherein the first mobile terminal generates location assistance information based on one or more of the received positioning satellite signals.

4. The method of claim 1, wherein the near field communication interface utilizes magnetic field induction to exchange location assistance information between the first mobile terminal and the second mobile terminal.

5. The method of claim 1, wherein the location assistance information further includes ephemeris and almanac information associated with the received positioning satellite signals.

6. The method of claim 5 further including searching for available positioning satellites by the second mobile terminal based on the received location assistance information from the first mobile terminal.

7. The method of claim 5 further including determining the position of the second mobile terminal based on the received location assistance information from the first mobile terminal.

8. The method of claim 7 further including updating the location assistance information received by the second mobile terminal by receiving at the second mobile terminal one or more positioning satellite signals directly from one or more positioning satellites.

9. A mobile terminal, comprising:
   a satellite receiver for receiving positioning satellite signals from one or more positioning satellites;
   a control circuit for processing the received positioning satellite signals and generating location assistance information based on the received positioning satellite signals, wherein the location assistance information includes one or more contemporaneous positioning satellite signals received by the satellite receiver; and
   a near field communication adapter configured to transfer the location assistance information to a remote mobile terminal through a near field communication protocol, wherein the location assistance information transferred to the remote terminal is operable to shorten a time-to-first-fix between the remote terminal and the one or more positioning satellites.

10. The mobile terminal of claim 9, wherein the satellite receiver is a global positioning receiver.

11. The mobile terminal of claim 9, wherein the received positioning satellite signals includes a navigation message.

12. The mobile terminal of claim 11, wherein the navigation message further includes ephemeris and almanac information.

13. The mobile terminal of claim 9 further including a user interface for manually initiating the transfer of location assistance information to the remote mobile terminal.

14. The mobile terminal of claim 9, wherein the near field communication adapter detects when the remote mobile terminal is within an operable range of the mobile terminal and automatically initiates transfer of the location assistance information to the remote mobile terminal.

15. The mobile terminal of claim 9, wherein the mobile terminal is configured to transmit the location assistance information in response to a request received from the remote mobile terminal.

16. The mobile terminal of claim 9, wherein the mobile terminal is configured to receive a profile associated with the remote mobile terminal through the near field communication interface.

17. The mobile terminal of claim 16, wherein the mobile terminal is configured to transfer the location assistance information based on the profile associated with the remote mobile terminal.

18. A method for exchanging location assistance information between mobile terminals, the method comprising:
   receiving one or more positioning satellite signals;
   generating location assistance information based at least in part on the received positioning satellite signals; and
   transferring the location assistance information through a near field communication interface from the first mobile terminal to a remote mobile terminal, wherein the location assistance information includes one or more contemporaneous positioning satellite signals received by the first mobile terminal and the location assistance information is used by the remote mobile terminal to shorten a time-to-first-fix with the one or more positioning satellites and/or improve accuracy of a computed location associated with the remote mobile terminal.

* * * * *